United States Patent [19]

Ruda

[11] Patent Number: 4,623,064
[45] Date of Patent: Nov. 18, 1986

[54] APPARATUS FOR STORAGE OF MOLDED DISCS

[75] Inventor: Joseph C. Ruda, Noblesville, Ind.

[73] Assignee: RCA Corporation, Princeton, N.J.

[21] Appl. No.: 771,818

[22] Filed: Sep. 3, 1985

[51] Int. Cl.[4] ............................................. B65D 85/57
[52] U.S. Cl. ................................. 206/445; 206/309;
206/522; 360/133; 220/449; 383/3
[58] Field of Search ............. 206/444, 445, 387, 522,
206/310, 309; 360/133; 220/441, 449; 150/50;
383/3

[56] References Cited

U.S. PATENT DOCUMENTS

| | | | |
|---|---|---|---|
| 2,678,861 | 5/1954 | Funk | 206/310 |
| 3,557,788 | 1/1971 | Swartz | 150/55 |
| 3,742,994 | 7/1973 | Pensak | 383/3 |
| 4,008,492 | 2/1977 | Elsing | 360/133 |
| 4,155,453 | 5/1979 | Ono | 206/522 |
| 4,157,713 | 6/1979 | Clarey | 128/87 R |
| 4,300,542 | 11/1981 | Baron | 128/87 R |
| 4,327,830 | 5/1982 | Patel et al. | 206/310 |
| 4,339,037 | 7/1982 | Doering | 206/444 |
| 4,432,401 | 2/1984 | Katz | 141/4 |

FOREIGN PATENT DOCUMENTS

| | | | |
|---|---|---|---|
| 126908 | 12/1984 | European Pat. Off. | 206/309 |
| 2821940 | 11/1978 | Fed. Rep. of Germany | 206/522 |
| 848248 | 9/1960 | United Kingdom | 206/522 |

*Primary Examiner*—William Price
*Assistant Examiner*—Brenda J. Ehrhardt
*Attorney, Agent, or Firm*—Birgit E. Morris; Donald S. Cohen

[57] ABSTRACT

An apparatus is disclosed for in-process storage of a stack of molded discs which is comprised of a rigid base member and inflatable tubular member attached to the base member which can be inflated so as to hold the stack of discs placed on the base member securely in position and protected from physical damage during storage.

5 Claims, 2 Drawing Figures

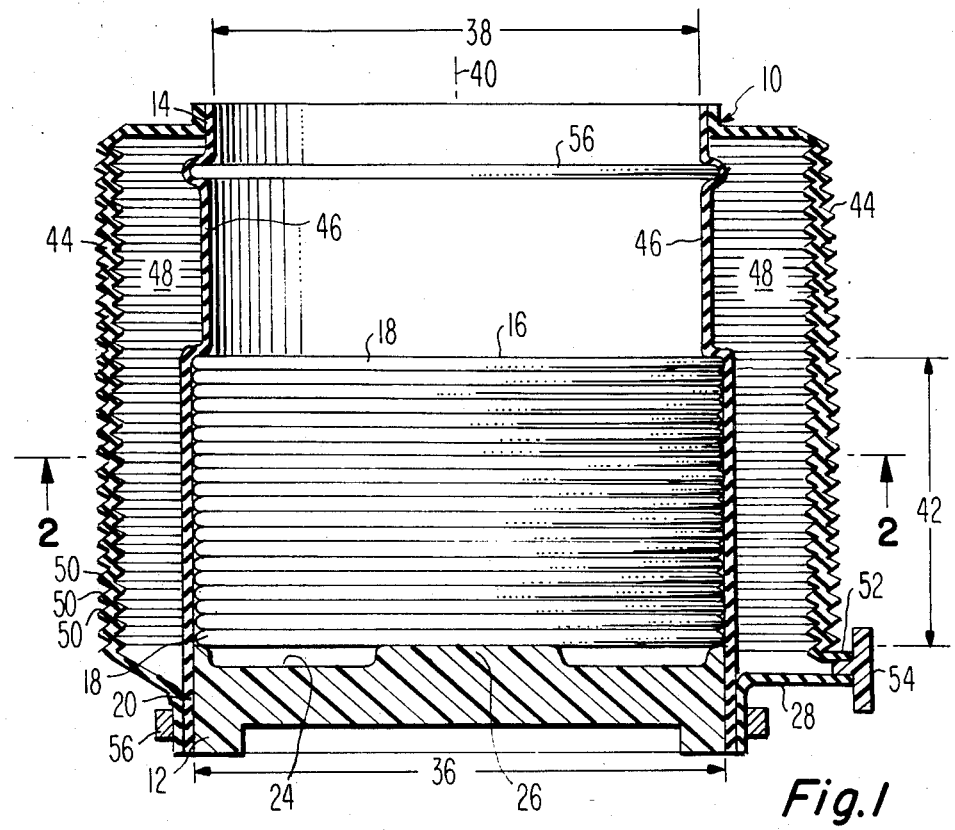
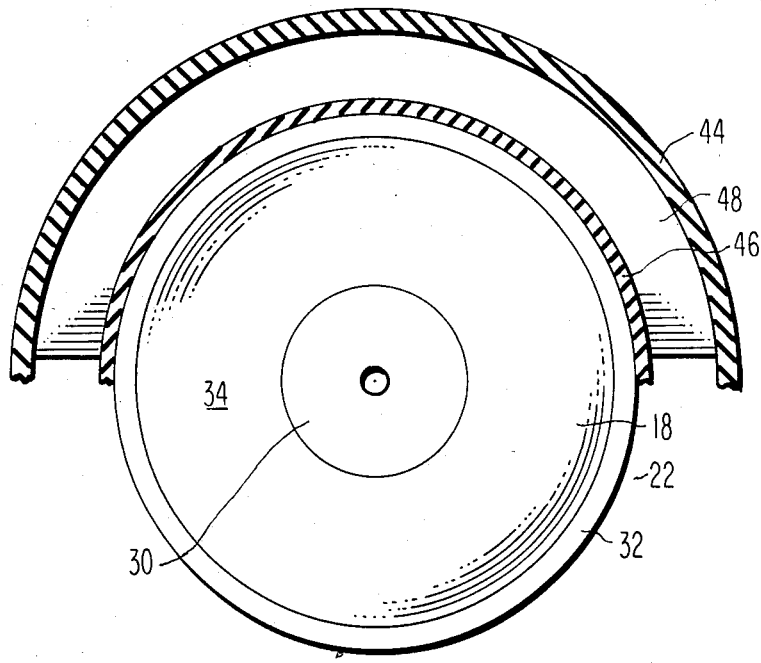

APPARATUS FOR STORAGE OF MOLDED DISCS

This invention relates to an apparatus for in process storage of molded discs.

BACKGROUND OF THE INVENTION

In the manufacture of molded records, such as conventional audio records, capacitive discs, and compact discs, the discs are normally pressed on an automatic molding press. The automatic presses typically include specialized stacking devices for on-machine storage of the finished discs. The specialized stacking devices can generally be removed from the presses and used for off-machine in-process storage of the finished discs prior to packaging and shipment. The use of the specialized stacking devices for off-machine storage, however, is highly undesirable. The specialized stacking devices used with the automatic molding press are generally quite expensive to purchase and the stored discs are not adequately protected from physical damage and are exposed to dust and other environmental contaminants while in off-machine storage.

What would be highly desirable would be a relatively low cost resuable package which would protect in-process discs during off-machine storage.

BRIEF SUMMARY OF THE INVENTION

A relatively inexpensive resuable package for in-process storage of molded discs is disclosed which is comprised of a rigid base member on which a stack of discs can be placed and an inflatable tubular member attached to the base member and which can be inflated to hold the stack of discs securely and protect them from physical damage and contamination during storage.

DETAILED DESCRIPTION OF THE INVENTION

Figure 1:
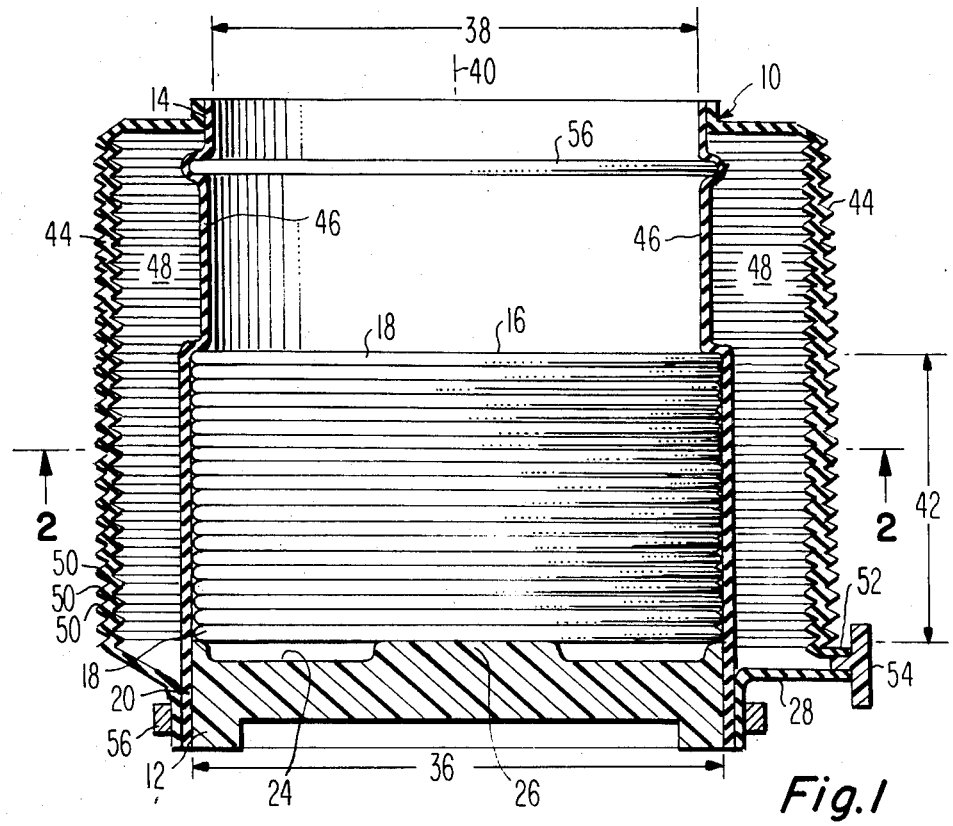
FIG. 1 is an illustration in partial cross-section of the apparatus of this invention having a stack of molded discs positioned within the apparatus.
Figure 2:
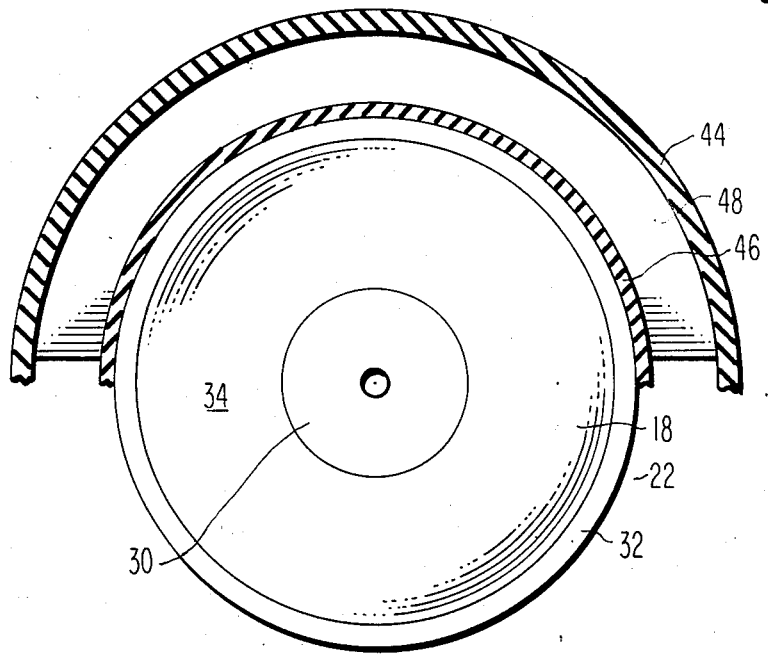
FIG. 2 is an illustration taken as indicated by the lines and arrows 2—2 on FIG. 1.

The apparatus 10 of this invention is comprised of a base member 12 and an inflatable tubular member 14 which is secured to the base member 12.

The base member 12 is made of a relatively rigid material which will support the weight of a stack of discs 16 placed on the base member 12. In order to minimize the possibility of damage to the individual discs 18 stored in the apparatus 10 it is preferable that the base member 12 be formed from a plastic similar to that used to form discs 18, such as polyvinyl chloride. The base member 12 has a cylindrical shape with the outer diameter of the base member 12 being approximately the same as the outer diameter of the discs 18 to be stored in the apparatus 10. The base member 12 has a face surface 24 on which the stack of discs 16 are placed when the apparatus 10 of this invention is employed. The face surface 24 can be flat but preferably is shaped with a center raised boss portion 26 and a raised outer boss portion 28 which matches the raised center portion 30 and the outer bead portion 32 of the disc 18 to prevent damage to the recorded area 34 of the disc 18 during storage.

The tubular member 14 is made of a relatively flexible somewhat elastomeric material so that it can be subjected to numerous inflations and deflations. A wide variety of materials can be employed to form the tubular member 14, such as flexible polyethylene silicon rubber and the like.

The tubular member 14 has a first and second open end portions 36, 38, is cylindrical in cross-section and has a central axis 40. The length of the tubular member is not critical but must be extendable in its inflated condition to a length which is at least equivalent to the height 42 of the stack of discs 16 which are to be stored in the apparatus 10.

The tubular member 14 is comprised of an outer wall 44 and an inner wall 46 which are connected together so as to form an inflatable space 48 between the inner and outer walls 44, 46. The outer wall 44, in the preferred embodiment shown in FIG. 1, includes a series of corrugations 50 along the length of the outer wall 44 so as to facilitate the tubular member 14 being collapsed into a more compact configuration about the base member 12 when the apparatus 10 is not in use for storage of discs. A port 52 is provided through the outer wall 44 and in communication with the space 48 for passage into and out of the space 48 of a fluid such as compressed air to inflate or deflate the tubular member 14. As illustrated, the port 52 is sealed with a removable plug 54, however, it is likewise possible to use other types of conventional well-known seal means for this purpose.

The inner wall 46 of the tubular member 14 in the deflated state has a diameter which is larger than the outer diameter 22 of the stack of discs 16 to be stored in the package 10. In the inflated state as shown in FIG. 1, the inner wall 46 is expanded so as to have a diameter of a size which is sufficient to engage the outer diameter of a stack of discs 16 positioned within the tubular member as illustrated in FIG. 1.

The first end 36 of the tubular member 14 is secured to the outer circumference 20 of the base member 12 with for example a band 56. The tubular member 14 extends away from the base member 12 with the central axis 40 being perpendicular to the face surface 24 and the second end portion 38 being in an opposing, spaced apart relationship with the face surface 24 of the base member 12.

To prevent the possibility of dust or other materials from contaminating a stack of discs 16 stored in the apparatus 10 a solid closure plate 56 can be positioned and locked in place across the second end portion 38.

In use the tubular member 14 is deflated so that the diameter inner wall 46 is larger than the outer diameter 22 of the stack of discs 16 to be stored in the apparatus 10. The stack of discs 16 are positioned on the face surface 24 of the base member 12. The tubular member 14 is then positioned about the stack of discs 16 and a fluid such as compressed air is introduced through the port 52 into the space 48 between the inner and outer walls 44, 46. A sufficient volume of fluid is introduced to force the inner wall 46 into engagement with the outer diameter 22 of the discs 18 with sufficient force to hold the stack of discs 16 in position during storage and the plug 54 is used to seal the port 52. The optional cover 56 can be placed in position if desired in order to provide further protection during storage of the stack of discs 16. To remove the stack of discs 16 from the apparatus 10 of this invention, the above procedure is reversed.

The apparatus 10 of this invention is both relatively inexpensive to manufacture and has the advantage that it can be reused numerous times for off-machine storage. The apparatus 10 has the further advantage that the stored discs are given additional protection because the inflated tubular member 14 positioned about the outer circumference of the stack of discs 16 protect the outer diameter edges of the discs from physical damage. The optional use of the cover plate 56 can likewise provide additional protection to prevent the stack of discs 16 from being subjected to dust or other environmental contaminants.

What is claimed is:

1. An apparatus for storage of a stack of molded discs of a predetermined outer diameter and a given height, said apparatus being comprised of:
   (a) a rigid cylindrically-shaped base member having an outer diameter of about said predetermined outer diameter and having a face surface for receiving a stack of discs;
   (b) an elongated tubular member having first and second end portions, a central axis and being extendable to a length at least equivalent to said given height, said tubular member having an outer wall and an inner wall connected together to form an inflatable space between said walls and means for passage of a fluid to and from said space, said inner wall of the tubular member being deflatable to a diameter larger than said predetermined diameter and being expandable to a diameter sufficient to securely engage the outer diameters of a stack of discs positioned within said tubular member; said first end of the tubular member being secured to the outer diameter of the base member with the central axis of the tubular member extending perpendicularly away from the face surface of the base member.

2. The apparatus according to claim 1 wherein the face surface has the configuration of the molded discs to be stored in said apparatus.

3. The apparatus according to claim 1 wherein the second end of the tubular member is sealed with a disc-shaped member positioned across the opening of said second end.

4. The apparatus according to claim 1 wherein the tubular member includes a plurality of spaced corrugations allowing the tubular member to be collapsed in a deflated state about said base member.

5. The apparatus according to claim 1 wherein the tubular member is formed of a flexible material.

* * * * *